(12) United States Patent
Nozawa et al.

(10) Patent No.: US 8,105,064 B2
(45) Date of Patent: Jan. 31, 2012

(54) MULTILAYERED FILM/SHEET MOLDING DIE

(75) Inventors: Kenji Nozawa, Numazu (JP); Koji Mizunuma, Sunto-Gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 931 days.

(21) Appl. No.: 11/909,384

(22) PCT Filed: Mar. 20, 2006

(86) PCT No.: PCT/JP2006/305545
§ 371 (c)(1),
(2), (4) Date: Sep. 21, 2007

(87) PCT Pub. No.: WO2006/101075
PCT Pub. Date: Sep. 28, 2006

(65) Prior Publication Data
US 2009/0035410 A1 Feb. 5, 2009

(30) Foreign Application Priority Data
Mar. 22, 2005 (JP) .................................. 2005-082491

(51) Int. Cl.
B29C 47/16 (2006.01)
B29C 47/86 (2006.01)
B29C 47/92 (2006.01)

(52) U.S. Cl. ............. 425/133.5; 425/192 R; 425/379.1; 425/381; 425/382.4; 425/462; 425/466

(58) Field of Classification Search ............... 425/133.5, 425/192 R, 379.1, 381, 382.4, 462, 465, 466
See application file for complete search history.

(56) References Cited

U.S. PATENT DOCUMENTS

| | | | | |
|---|---|---|---|---|
| 3,559,239 A * | 2/1971 | Work et al. | ................ | 425/133.5 |
| 3,759,653 A * | 9/1973 | Schreiber | ...................... | 425/461 |
| 3,856,448 A | 12/1974 | Iijima et al. | | |
| 4,454,084 A * | 6/1984 | Smith et al. | .................. | 264/40.1 |
| 4,731,213 A * | 3/1988 | Klepsch | ........................ | 264/512 |
| 5,814,258 A * | 9/1998 | Ogawa et al. | ............ | 264/173.12 |
| 6,203,742 B1 * | 3/2001 | Kegasawa et al. | ....... | 264/173.16 |
| 2004/0139913 A1 * | 7/2004 | Kuromiya | ...................... | 118/668 |

FOREIGN PATENT DOCUMENTS

| | | |
|---|---|---|
| JP | 61-283522 | 12/1986 |
| JP | H02-078323 U | 6/1990 |

(Continued)

OTHER PUBLICATIONS

Office Action issued in counterpart Taiwanese Application No. 0962070781001, mailed Dec. 21, 2007.

(Continued)

Primary Examiner — Yogendra Gupta
Assistant Examiner — Joseph Leyson
(74) Attorney, Agent, or Firm — DLA Piper LLP US

(57) ABSTRACT

For the purpose of molding a multilayered film/sheet having a highly precise thickness of each layer, movable choker bars (31, 32) are movably arranged in the middle of molten resin channels (111, 112), and a plurality of choker adjustment bolts (35, 36) are arranged at a predetermined pitch in the die width direction. The choker bars with the choker adjustment bolts are moved so as to adjust the gap in a choker portion. Thermal conductors (37, 38) are provided with the respective choker adjustment bolts.

14 Claims, 4 Drawing Sheets

FOREIGN PATENT DOCUMENTS

| | | |
|---|---|---|
| JP | 05-228975 | 9/1993 |
| JP | 07-001543 | 1/1995 |
| JP | 7-15321 U | 3/1995 |
| JP | 08-112852 | 5/1996 |
| JP | H09-300432 | 11/1997 |
| JP | 10-217310 | 8/1998 |
| JP | 11-309770 | 11/1999 |
| JP | 2000-202843 | 7/2000 |
| JP | 2001-158036 | 6/2001 |
| JP | 2003-181904 | 7/2003 |
| TW | 263832 | 11/1995 |

OTHER PUBLICATIONS

Partial English translation of TW 263832, published Nov. 21, 1995.
Office Action issued in counterpart Japanese Application 2007-509269 on Dec. 4, 2009.
English Translation of Office Action issued in counterpart Japanese Application 2007-509269 on Dec. 4, 2009.
English Language Abstract of JP 2003-181904 published Jul. 3, 2003.
English Machine Translation of JP 2003-181904 published Jul. 3, 2003.
English Language Abstract of JP H10-217310 published Aug. 18, 1998.
English Machine Translation of JP H10-217310 published Aug. 18, 1998.
English Language Abstract of JP 2001-158036 published Jun. 12, 2001.
English Machine Translation of JP 2001-158036 published Jun. 12, 2001.
English Language Abstract of JP 2000-202843 published Jul. 25, 2000.
English Machine Translation of JP 2000-202843 published Jul. 25, 2000.
English Language Abstract of JP H11-309770 published Nov. 9, 1999.
English Machine Translation of JPH11-309770 published Nov. 9, 1999.
English Language Abstract of JP H08-112852 published May 7, 1996.
English Machine Translation of JP H08-112852 published May 7, 1996.
English Machine Translation of JP H07-015321 published Mar. 14, 1995.
English Machine Abstract of JP H02-078323 published Jun. 15, 1990.
English Language Abstract of JP H09-300432 published Nov. 25, 1997.
English Machine Translation of JP H09-300432 published Nov. 25, 1997.
Korean Office Action issued in Korean Application No. 10-2007-7024024, mailed Mar. 9, 2009.
English Translation of Korean Office Action issued in Korean Application No. 10-2007-7024024, mailed Mar. 9, 2009.
Chinese Office Action issued in CN Appl 2006800093669 on Jul. 24, 2009.
Korean Office Action issued in Application No. 10-2007-7024024 mailed Jul. 29, 2008.
English Translation of Korean Office Action issued in Application No. 10-2007-7024024 mailed Jul. 29, 2008.
Japanese Office Action issued in JP 2007-509269 on Feb. 15, 2011.
English Translation of Japanese Office Action issued in JP 2007-509269 on Feb. 15, 2011.
English Language Abstract of JP 05-228975 published on Sep. 7, 1993.
English Language Translation of JP 05-228975 published on Sep. 7, 1993.
English Language Abstract of JP 61-283522 published on Dec. 13, 1986.
English Language Abstract of JP 07-001543 published on Jan. 6, 1995.
English Language Translation of JP 07-001543 published on Jan. 6, 1995.
English Language Abstract of JP H07-015321 published Jan. 17, 1995.

* cited by examiner

MULTILAYERED FILM/SHEET MOLDING DIE

TECHNICAL FIELD

The present invention relates to a die for use in molding a multilayered film/sheet, more particularly to a multilayered film/sheet die (multi manifold die) of a multi manifold system.

BACKGROUND ART

To set a thickness of a molded multilayered film/sheet to be constant during molding of the multilayered film/sheet by a multi manifold die (T-die), a flow rate distribution of a molten resin needs to be uniform in a width direction of the die after molten resins of layers are combined. Moreover, needless to say, a die dwell time distribution needs to be uniform in the width direction of the die. Furthermore, the flow rate distribution of the molten resins of the respective layers before the resins are combined needs to be also uniform in the width direction of the die, and the die dwell time distribution needs to be also uniform in the width direction of the die.

In addition, to obtain a uniform flow rate distribution and a uniform die dwell time distribution, in the die for molding the multilayered film/sheet by a multi manifold method, a shape of each-layer manifold or a pressure loss adjustment land is determined by simulation and analysis by a computer. In this case, the shape of the manifold or the pressure loss adjustment land is a considerably complicated curved shape, but working of the complicated curved shape has become possible by the use of a high-precision numerical control machine tool.

In the molding of the multilayered film/sheet, the characteristics of resin change for each layer depending on operation conditions of a film/sheet molder or a resin type same as in molding of a single-layer film/sheet. The resin characteristics vary depending on the operation conditions of the film/sheet molder. Therefore, even when the shapes of the manifold and the pressure loss adjustment land are optimized as described above, it is difficult to obtain a uniform thickness of the film/sheet on all operation conditions.

Moreover, the molten resins of the respective layers are combined in the die, and the junction is influenced by a difference in the resin characteristics of the layers or characteristics of a target-layer resin. It is difficult to completely simulate a resin behavior in this junction, and the behavior is often simulated for a simple model.

Heretofore, the thickness of the multilayered film/sheet fluctuates with the operation conditions, the resin type, and further the combination of the respective layers. The fluctuation is compensated for by changing a gap between choker portions for each layer to thereby adjust the thickness of each layer. A gap between lips in an outlet of the die is adjusted to thereby adjust the thicknesses of all the layers.

A die for molding a two-layer film/sheet is often provided with a choker portions in molten resin channels of the respective layers, respectively. In a die for molding a three-layer film/sheet, when all of the three layers are provided with a choker portion, a die structure becomes complicated. Moreover, the die shape becomes very large, and it is difficult to handle the die easily. Therefore, in general, the choker portion is disposed only in the outer-layer or inner-layer molten resin channel in many cases.

However, in a case where the choker portion is disposed only in the outer-layer or inner-layer molten resin channel, it is difficult to precisely adjust each layer. Therefore, it is difficult to mold a film/sheet which has a satisfactory precision of thickness.

The gap between the choker portions is adjusted by turning a choker adjustment bolt, and moving a choker bar in a vertical direction (a direction to change a sectional area of the molten resin channel in the die). In an ordinary die, a plurality of choker adjustment bolts are arranged at a pitch of about 30 to 60 mm in the die width direction.

To set the thickness of the film/sheet to be uniform, these choker adjustment bolts are operated, and the gap between the choker portions is adjusted every portion provided with each choker adjustment bolt. In general, the choker bar has a square bar configuration, and is made of the same type of steel material as that of a die main body.

In the choker portion gap adjustment which is performed by turning each choker adjustment bolt to change a movement of the choker bar, the choker bar is bent every pitch of several choker adjustment bolts, and the gap between the choker portions is changed depending on the shape of the bent bar. The choker bar cannot be bent into a wavy shape at every choker adjustment bolt. That is, it is difficult to adjust a small gap between the choker portions at a small pitch, and the thickness cannot be adjusted at a small pitch.

An automatic control system is known in which a rotary actuator is attached to each choker adjustment bolt, the thickness of the film/sheet is automatically measured, each rotary actuator is feedback-controlled by the measured value, and the thickness of the film/sheet is automatically controlled.

In this case, the gap between the choker portions is automatically adjusted, but the small gap between the choker portions cannot be adjusted at the small pitch, and the thickness adjustment at the small pitch cannot be performed in the same manner as in the manual adjustment.

If a choker portion is provided for every of the three layers, as described above, the die structure becomes complicated, and large in scale. Therefore, the choker portion is disposed in the only outer-layer or inner-layer molten resin channel in many cases.

Moreover, there is also known a die for molding a multilayered film/sheet, in which a cartridge heater is buried in the die main body, the main body is heated with a heater to change the viscous characteristics of the molten resins in the molten resin channels of the respective layers, and a flow rate of the molten resin is controlled to thereby adjust the thickness of the film/sheet.

There is also a system in which a plurality of cartridge heaters are arranged at a predetermined pitch from the back of the die in a die width direction, and the temperature of each heater is adjusted to thereby change flow characteristics of the resin in the manifold and adjust the thickness of the film/sheet. In this system, when the molten resin flowing from the center of the die into the manifold spreads in the width direction of the die in the manifold, the molten resin flowing toward die end portions is influenced by the heater at the center of the die.

Therefore, during the adjustment of the thickness of the film/sheet, complicated control is required for the die end portion in consideration of the influence of upstream control at the center of the die. From viewpoints of resin characteristics, it is sometimes difficult to set the thickness of the film/sheet to be constant due to mutual interference with the temperature controls on upstream and downstream sides.

In a system in which a plurality of cartridge heaters are arranged at a predetermined pitch in a die outlet width direction, and the temperature of each heater is adjusted, it is possible to individually control the heaters in the width direction. Therefore, the system is effectively used in molding a film or a thin sheet. However, in case of a thick sheet, it is difficult to sufficiently control the thickness of the sheet due to a lack of quantity of heat of the heater, and therefore the system is hardly used.

In the die for molding the three-layer film/sheet, the cartridge heater disposed between the outer-layer molten resin channel and the inner-layer molten resin channel heats the outer-layer and inner-layer molten resin channels at the same time, and it is difficult to precisely control the temperature of the molten resin of each layer. It is considered that an insulating portion made of an insulating material be disposed between this heater and the outer-layer molten resin channel so as to prevent the outer-layer molten resin from being unnecessarily influenced by this heater, but it is often difficult to dispose the insulating portion in a limited structure space.

DISCLOSURE OF THE INVENTION

An object of the present invention is to mold a multilayered film/sheet having a highly precise thickness.

A multilayered film/sheet molding die according to the present invention is a multi manifold system multilayered film/sheet die that includes a plurality of manifold portions and a plurality of molten resin channels. The molding die includes a choker portion gap adjustment mechanism in which at least one of the plurality of molten resin channels has a movable choker bar movably arranged in the middle thereof, and in which the choker bar is moved by a plurality of choker adjustment bolts arranged at a predetermined pitch in the die width direction. Thus, the gap in the choker portion is adjusted. Each of the choker adjustment bolts is provided with a thermal conductor.

In a case where the multilayered film/sheet molding die according to the present invention is a multilayered film/sheet die used for molding multilayered film/sheet with layers of different thicknesses from each other, it is preferable that the movable choker bar be movably arranged in the middle of only the molten resin channel for the thinner layer, and that each of the choker adjustment bolts of the respective movable choker bars be provided with the thermal conductor.

A multilayered film/sheet molding die according to the present invention is a multi manifold system multilayered film/sheet die that includes two manifold portions and two molten resin channels for two outer layers, and at least one manifold portion and at least one molten resin channel for at least one inner layer. The molding die includes a choker portion gap adjustment mechanism for the outer layers in which mechanism, a movable choker bar is movably arranged in the middle of each molten resin channel for the outer layer, and, in which mechanism, the choker bar is moved by a plurality of choker adjustment bolts arranged at a predetermined pitch in the die width direction. Thus, the gap in the choker portion is adjusted.

A multilayered film/sheet molding die according to the present invention is a multi manifold system multilayered film/sheet die that includes two manifold portions and two molten resin channels for two outer layers, and at least one manifold portion and at least one molten resin channel for at least one inner layer. The molding die includes a choker portion gap adjustment mechanism for the outer layers in which mechanism, a movable choker bar is movably arranged in the middle of each molten resin channel for each outer layer, and, in which mechanism, the choker bar is moved by a plurality of choker adjustment bolts arranged at a predetermined pitch in the die width direction. Thus, the gap in the choker portion is adjusted. A fixed choker bar is fixedly arranged in the middle of each molten resin channel for each inner layer, and each of the choker adjustment bolts is provided with a thermal conductor. Thermal conductors are arranged at a predetermined pitch in the die width direction in the portion where the fixed choker bar is arranged.

A multilayered film/sheet molding die according to the present invention is a multi manifold system multilayered film/sheet die that includes two manifold portions and two molten resin channels for two outer layers, and at least one manifold portion and at least one molten resin channel for at least one inner layer. The molding die includes a choker portion gap adjustment mechanism for the outer layers in which mechanism, a movable choker bar is movably arranged in the middle of each molten resin channel for each outer layer, and, in which mechanism, the choker bar is moved by a plurality of choker adjustment bolts arranged at a predetermined pitch in the die width direction. Thus, the gap in the choker portion is adjusted. Each of the choker adjustment bolts is provided with a thermal conductor. Thermal conductors are arranged at a predetermined pitch in the die width direction in the middle of each molten resin channel for each inner layer.

In the multilayered film/sheet molding die according to the present invention, it is preferable that each of the thermal conductors be provided with a temperature sensor.

The multilayered film/sheet molding die according to the present invention preferably further includes an upper and a lower lip portions. The molding die preferably includes a die outlet that the upper and the lower lip portions define into a slit shape which is long in the die width direction. The molding die preferably includes a lip gap adjustment mechanism for adjusting the gap between the lips in the die outlet.

The multilayered film/sheet molding die according to the present invention preferably further includes an upper and a lower lip portions. The molding die preferably includes a die outlet that the upper and the lower lip portions define into a slit shape which is long in the die width direction. The molding die preferably includes a plurality of heater elements that are installed at a predetermined pitch in the die width direction at least one of the upper and the lower lip portions. The respective temperatures of the heater elements are individually adjustable.

BEST MODES FOR CARRYING OUT THE INVENTION

Figure 1:
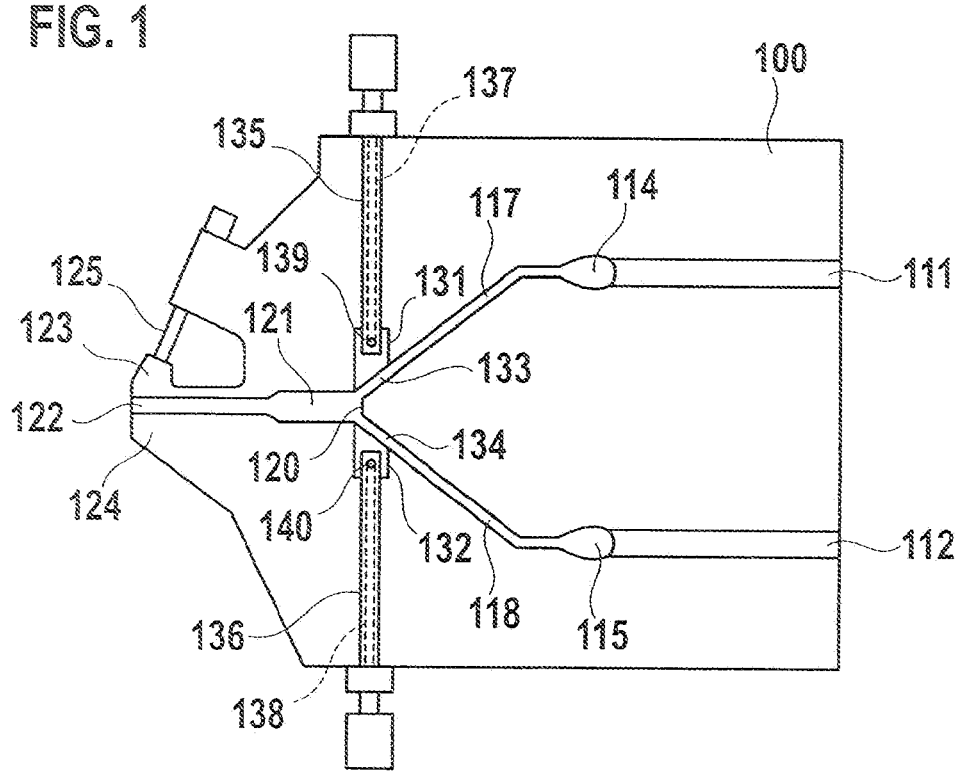
FIG. 1 is a vertical sectional view showing an embodiment in which a die for molding a multilayered film/sheet in the present invention is applied to a die for molding a two-layer film/sheet.

There will be described an embodiment in which a die for molding a multilayered film/sheet in the present invention is applied to a die for molding a two-layer film/sheet with reference to FIG. 1.

The multilayered film/sheet molding die of the present embodiment is provided, on a die main body 100, two upper and lower resin inlet channels 111, 112, and two manifold portions 114, 115 which are elongated in a die width direction.

The resin inlet channels 111, 112 individually communicate with the manifold portions 114, 115 in the center of the die in the width direction, respectively.

Molten resin channels 117, 118 are separately formed on outlet sides of the manifold portions 114, 115. The molten resin channels 117, 118 of the respective layers are elongated in the die width direction in the same manner as in the manifold portions, and shapes of the channels are optimized by computer simulation.

The molten resin channels 117 and 118 are combined into one channel in a confluent portion 120. The confluent portion 120 communicates with a die outlet 122 in a front face of the die main body 100 by a confluent molten resin channel 121 which extends in the die width direction.

The die outlet 122 is defined into a slit shape which is long in the die width direction by an upper lip portion 123 and a lower lip portion 124.

The die main body 100 is provided with a plurality of lip adjustment bolts 125 at a predetermined pitch in the die width direction. When each lip adjustment bolt 125 is turned, the upper lip portion 123 is elastically deformed by the lip adjustment bolt 125, and a gap between the lips in the die outlet 122 can be finely adjusted. This structure is a lip gap adjustment mechanism.

Movable choker bars 131, 132 are movably arranged in the middle of two upper and lower molten resin channels 117, 118, respectively. The movable choker bars 131, 132 constitute variable choker portions 133, 134 in the middle of the molten resin channels 117, 118.

A plurality of hollow choker bolts (choker adjustment bolts) 135, 136 are arranged at a predetermined pitch (about 20 to 60 mm) in the die width direction in the die main body 100. The hollow choker bolt 135 is connected to the upper movable choker bar 131, and turned to thereby move the movable choker bar 131 vertically, and the gap in the choker portion 133 is adjusted. The hollow choker bolt 136 is connected to the lower movable choker bar 132, and turned to thereby move the movable choker bar 132 vertically, and the gap in the choker portion 134 is adjusted. This is a choker portion gap adjustment mechanism.

Thermal conductors 137, 138 having thin rod shapes are inserted into portions corresponding to the movable choker bars 131, 132 in hollow portions of the upper and lower hollow choker bolts 135, 136. That is, distal ends of the thermal conductors 137, 138 are inserted into the hollow portions of the hollow choker bolts 135, 136 so as to reach the portions corresponding to the movable choker bars 131, 132.

Each of the thermal conductors 137, 138 can be of a heat medium type pipe such as a cartridge heater or a double pipe. The distal ends of the thermal conductors on the side of the movable choker bars 131, 132 contain temperature sensors 139, 140 capable of measuring the temperatures precisely, so that the temperatures are controlled independently.

It is to be noted that each of the choker adjustment bolts for the movable choker bars 131, 132 may be a heat medium bolt, and the choker adjustment bolt itself may be constituted as the thermal conductor.

When electric currents supplied to the thermal conductors 137, 138 are controlled according to the temperatures measured by the temperature sensors 139, 140, the temperatures of the respective thermal conductors 137, 138 can be controlled individually and precisely. It is to be noted that the temperature sensors 139, 140 can be omitted depending on a required film/sheet thickness precision.

A flow over the whole die width changes in a large surge in a case where resin characteristics during actual operation are different from conditions under which the die channels are simulated by the computer, or a case where the operation is performed using a resin of a type different from that for which the simulation was conducted. This large surge is adjusted and compensated by operations of the hollow choker bolts 135, 136.

Heat of the thermal conductor 137 is conducted to the movable choker bar 131, and the surface temperature of the choker bar 131 is determined by the thermal conductor 137. Heat of the thermal conductor 138 is conducted to the movable choker bar 132, and the surface temperature of the movable choker bar 132 is determined by the thermal conductor 138.

A large amount of the molten resin in each of the choker portions 133, 134 flows at the location where the surface temperature of each of the movable choker bars 131, 132 is high, since viscosity of the resin is lowered depending on resin characteristics. Thus the thickness of the film/sheet of the corresponding portion increases. Conversely, the flows of the molten resins are reduced at the portions where the surface temperatures of the movable choker bars 131, 132 are low, and the thickness of the film/sheet of the corresponding portion decreases.

Since the choker portions 133, 134 have a small channel structure, the flow characteristics of the resin in the channel can be sufficiently controlled by the temperature. Consequently, when the pitch is excessively small for the choker portion gap adjustment by the hollow choker bolts 135, 136, the adjustment can be performed under temperature control by the thermal conductors 137, 138.

As described above, the choker portion gap adjustment by the hollow choker bolts 135, 136 is preferably manually performed, and the thermal conductor control (temperature control) by the thermal conductors 137, 138 is preferably automatically preformed.

According to the present embodiment, the multilayered film/sheet molding die is preferably used in a film/sheet molder of an automatic control system which executes a feedback control by automatic measurement of the film/sheet thickness. The respective thermal conductors 137, 138 can execute the thermal conductor control (temperature control)

in accordance with an automatic measurement result of the film/sheet thickness so that the film/sheet thickness becomes constant.

It is to be noted that in a simplified machine, the set temperatures of the respective thermal conductors 137, 138 may be manually input based on the automatic measurement result of the film/sheet thickness.

When the thermal conductors 137, 138 are of a heat medium type, the surface temperatures of the movable choker bars 131, 132 can be forcibly set to be low. In consequence, a control amount by the temperature can be set in a large range.

As described above, when the choker portion gap adjustment by the hollow choker bolts 135, 136 and the thermal conductor control by the thermal conductors 137, 138 are both used for each layer, it is possible to mold a multilayered film/sheet having a highly precise thickness even if operation conditions largely differ, or a resin type changes.

In the case where the same type of resin is used, it is possible to mold the multilayered film/sheet having the highly precise thickness under the thermal conductor control by the thermal conductors 137, 138 and the lip gap adjustment by the lip adjustment bolt 125. In consequence, it is possible to mold an optical multilayered film/sheet, with a satisfactory productivity, which requires a high thickness precision and which utilizes birefringence.

As described above, the present embodiment enables the resin thickness adjustment for each layer. Furthermore, when the lip gap adjustment is performed, it is possible to mold the multilayered film/sheet in which the thickness of the resin of each layer and the whole thickness are highly precise.

Figure 5:
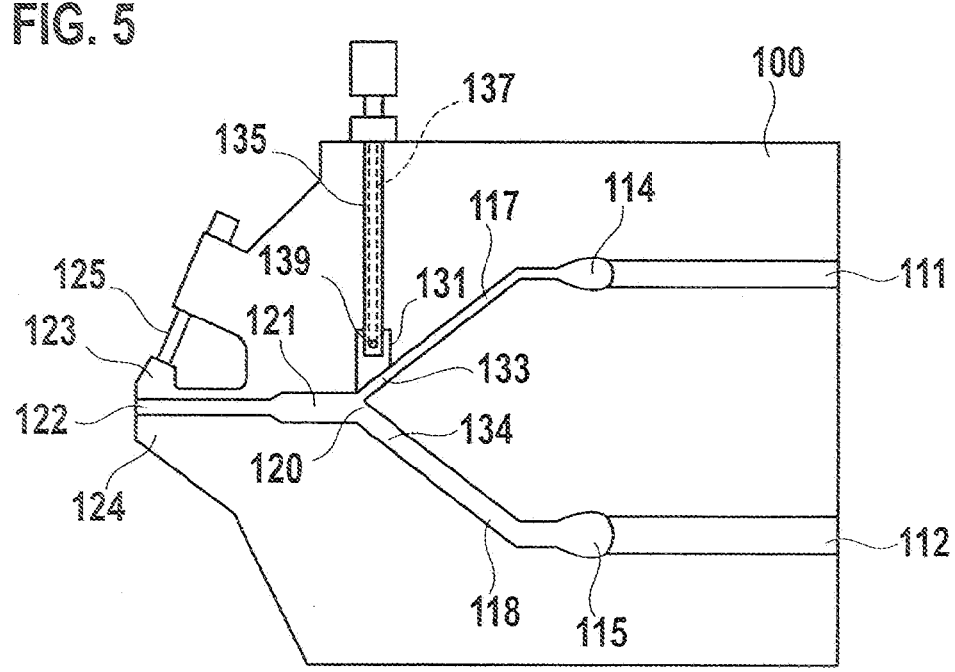
FIG. 5 is a vertical sectional view showing another embodiment in which the die for molding the multilayered film/sheet in the present invention is applied to the die for molding the two-layer film/sheet.

It is to be noted that the movable choker bars and the thermal conductors are not necessarily provided to each of the layers. As shown in FIG. 5, the movable choker bar 131, the hollow choker bolts 135, the thermal conductors 137, and the temperature sensors 139 may be provided only to the molten resin channel 117 on one side.

When the movable choker bar 131, the hollow choker bolts 135, the thermal conductors 137, and the temperature sensors 139 are provided only to the molten resin channel 117 on one side, the number of necessary component parts is reduced, the mechanical structure is simplified, and the control system for these components is simplified in comparison to the case where these components are provided to the molten resin channels on both sides.

FIG. 5 shows a multilayered film/sheet die for molding a multilayered film/sheet in which the thicknesses of respective layers are different from one another. In the multilayered film/sheet die, the resin inlet channel 112 and the molten resin channel 118 have larger channel sectional areas respectively than the resin inlet channel 111 and the molten resin channel 117.

Assume a case where the thickness of layer is adjusted by a thermal conductor. When a layer has a greater thickness of layer and a greater flow rate of resin, the thermal conductor can cause only a small change in the thickness of that layer. A smaller thickness of layer enables the thermal conductor to carry out the adjustment of the thickness of layer more sensitively and effectively. Also in this case, the total thickness can be adjusted with the lip gap.

Consequently, in the case of providing movable choker bar, hollow choker bolts, thermal conductors, and the like only to molten resin channel on one side, the movable choker bar 131 may be movably arranged only in the middle of the molten resin channel with a smaller thickness of layer, in this case, only in the middle of the molten resin channel 117. Additionally, thermal conductors 137 may be provided to the respective hollow choker bolts 135 of the corresponding movable choker bar 131.

As described above, the following advantage is obtained. Even in a case of providing the thermal conductors only to one side, irregularity adjustment can be carried out at a shorter pitch than in the case of a conventional type die in which choke bars are pushed and pulled.

Figure 2:
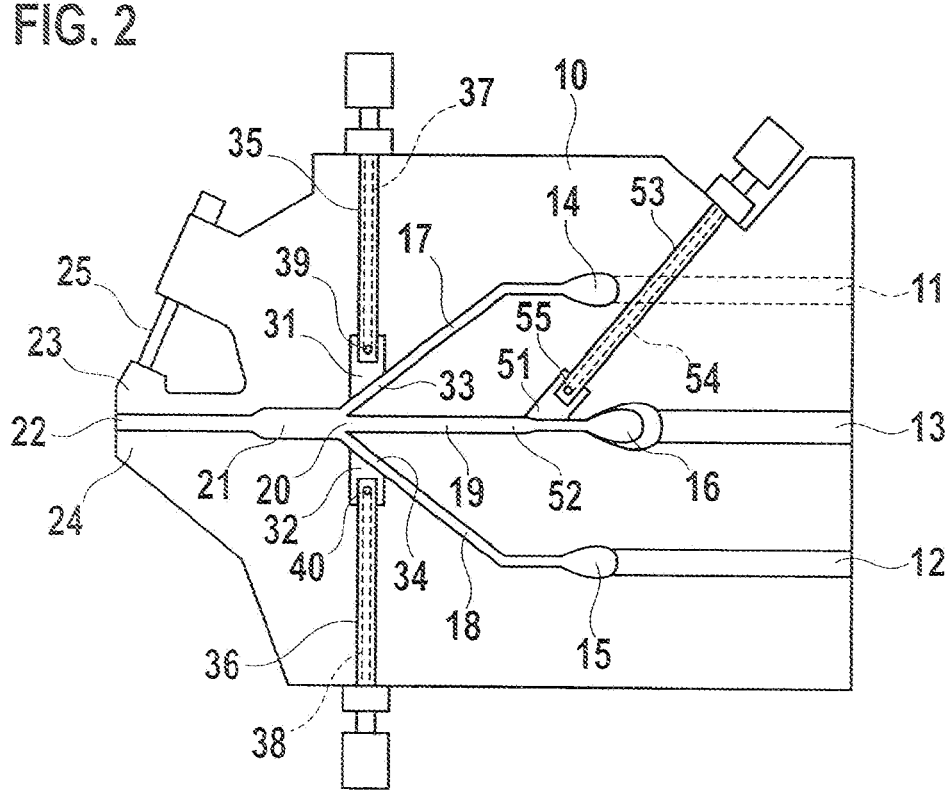
FIG. 2 is a vertical sectional view showing an embodiment in which the die for molding the multilayered film/sheet in the present invention is applied to a die for molding a three-layer film/sheet.

There will be described an embodiment in which the multilayered film/sheet molding die of the present invention is applied to a three-layer film/sheet molding die with reference to FIG. 2.

The multilayered film/sheet molding die of the present embodiment is a three-layer film/sheet molding die. A die main body 10 includes: two upper and lower outer-layer resin inlet channels 11, 12; an inner-layer resin inlet channel 13 at an intermediate portion; and two outer-layer manifold portions 14, 15 and an inner-layer manifold portion 16 elongated in a die width direction.

The outer-layer resin inlet channels 11, 12 and the inner-layer resin inlet channel 13 individually communicate with the outer-layer manifold portions 14, 15 and the inner-layer manifold portion 16, respectively, at the center of the die width direction.

Outer-layer molten resin channels 17, 18, and an inner-layer molten resin channel 19 are formed on an outlet side of the outer-layer manifold portions 14, 15 and the inner-layer manifold portion 16 respectively. The molten resin channels 17 to 19 of the respective layers are elongated in the die width direction in the same manner as in the manifold portions, and shapes of the channels are optimized by computer simulation.

The outer-layer molten resin channels 17 and 18 and the inner-layer molten resin channel 19 are formed into channel shapes combined into one channel at a confluent portion 20, and the confluent portion 20 communicates with a die outlet 22 in a front face of the die main body 10 by a confluent molten resin channel 21 which is elongated in the die width direction.

The die outlet 22 is of a slit shape elongated in the die width direction defined by an upper lip portion 23 and a lower lip portion 24.

A plurality of lip adjustment bolts 25 are attached to the die main body 10 at a predetermined pitch in the die width direction. When each lip adjustment bolt 25 is turned, the upper lip portion 23 is elastically deformed every lip adjustment bolt 25, and a gap between the lips in the die outlet 22 can be finely adjusted. This structure is a lip gap adjustment mechanism.

Movable choker bars 31, 32, and 51 are movably arranged in the middle of the outer-layer molten resin channels 17, 18 and the inner-layer molten resin channel 19, respectively. The movable choker bars 31, 32, and 51 constitute variable choker portions 33, 34, and 52 in the middle of the outer-layer molten resin channels 17, 18, and the inner-layer molten resin channel 19.

A plurality of hollow choker bolts (choker adjustment bolts) 35, 36, and 53 are arranged at a predetermined pitch (about 20 to 60 mm) in the die width direction in the die main body 10. The hollow choker bolt 35 is connected to the upper movable choker bar 31, and turned to thereby move the movable choker bar 31 vertically, and a gap in the choker portion 33 is adjusted. The hollow choker bolt 36 is connected to the lower movable choker bar 32, and turned to thereby move the movable choker bar 32 vertically, and a gap in the choker portion 34 is adjusted. The hollow choker bolt 53 is connected to the movable choker bar 51 of an intermediate portion, and turned to thereby move the movable choker bar 51 vertically, and a gap in the choker portion 52 is adjusted. This is a choker portion gap adjustment mechanism.

Thermal conductors 37, 38, and 54 having thin rod shapes are inserted into portions corresponding to the movable choker bars 31, 32, and 51 in hollow portions of the plurality of hollow choker bolts 35, 36, and 53. That is, distal ends of the thermal conductors 37, 38, and 54 are inserted into the hollow portions of the hollow choker bolts 35, 36, and 53 so as to reach the portions corresponding to the movable choker bars 31, 32, and 51.

Each of the thermal conductors 37, 38, and 53 can be of a heat medium type pipe such as a cartridge heater or a double pipe. The distal ends of the thermal conductors on the side of the movable choker bars 31, 32, and 51 contain temperature sensors 39, 40, and 55 capable of measuring temperatures precisely, so that the temperatures are controlled independently.

It is to be noted that each of the choker adjustment bolts for the movable choker bars 31, 32, and 51 may be constituted of a heat medium bolt, and the choker adjustment bolt itself may be constituted as the thermal conductor.

When electric currents supplied to the thermal conductors 37, 38, and 54 are controlled depending on the temperatures measured by the temperature sensors 39, 40, and 55, the temperatures of the respective thermal conductors 37, 38, and 54 can be controlled individually and precisely. It is to be noted that the temperature sensors 39, 40, and 54 can be omitted depending on a required film/sheet thickness precision.

A resin flow in the whole die width direction changes in a large surge in a case where resin characteristics during actual operation are different from conditions at a time when the die channels are simulated by the computer, or a case where the operation is performed using a resin of a type different from that for which the simulation was preformed. This large surge is adjusted and compensated by operations of the hollow choker bolts 35, 36, and 53.

Heat of the thermal conductor 37 is conducted to the movable choker bar 31, and the surface temperature of the choker bar 31 is determined by the thermal conductor 37. Heat of the thermal conductor 38 is conducted to the movable choker bar 32, and the surface temperature of the movable choker bar 32 is determined by the thermal conductor 38. Heat of the thermal conductor 54 is conducted to the movable choker bar 51, and the surface temperature of the movable choker bar 51 is determined by the thermal conductor 54.

A large amount of the molten resin in each of the choker portions 33, 34, and 52 flows at a location where the surface temperature of each of the movable choker bars 31, 32, and 51 is high, since viscosity of the resin is lowered depending on resin characteristics. Thus the thickness of the film/sheet of the corresponding portion increases. Conversely, the flows of the molten resins are reduced at the location where the surface temperatures of the movable choker bars 31, 32, and 51 are low, and the thickness of the film/sheet of the corresponding portion decreases.

Since the choker portions 33, 34, and 52 have a small channel structure, the flow characteristics of the resin in the channel can be sufficiently controlled by the temperature. Consequently, when the pitch is excessively small for the choker portion gap adjustment by the hollow choker bolts 35, 36, and 53, the adjustment can be performed under temperature control by the thermal conductors 37, 38, and 54.

As described above, the choker portion gap adjustment by the hollow choker bolts 35, 36, and 53 is preferably manually performed, and the thermal conductor control (temperature control) by the outer-layer thermal conductors 37, 38, and 54 is preferably automatically performed.

According to the present embodiment, the multilayered film/sheet molding die is also preferably used in a film/sheet molder of an automatic control system which executes a feedback control by automatic measurement of the film/sheet thickness. The respective thermal conductors 37, 38, and 54 can execute the thermal conductor control (temperature control) in accordance with an automatic measurement result of the film/sheet thickness so that the film/sheet thickness becomes constant.

When the thermal conductors 37, 38, and 54 are of a heat medium type, the surface temperatures of the movable choker bars 31, 32, and 51 can be set for a low temperature. Therefore, a control amount by the temperature can be set within a large range.

As described above, when the choker portion gap adjustment by the hollow choker bolts 35, 36, and 53 and the thermal conductor control by the thermal conductors 37, 38, and 54 are both used for the outer and inner layers, it is possible to mold a multilayered film/sheet having a highly precise thickness, even if operation conditions largely differ, or a resin type changes.

In the case where the same type of resin is used, it is possible to mold the multilayered film/sheet having the highly precise thickness under the thermal conductor control by the thermal conductors 37, 38, and 55 and the lip gap adjustment by the lip adjustment bolt 25. In consequence, it is possible to mold an optical multilayered film/sheet, with a satisfactory productivity, which requires a high thickness precision and which utilizes birefringence.

As described above, the present embodiment enables the resin thickness adjustment for each layer. Furthermore, when the lip gap adjustment is performed, it is possible to mold the multilayered film/sheet in which the thickness of the resin of each layer and the whole thickness are highly precise.

Figure 3:
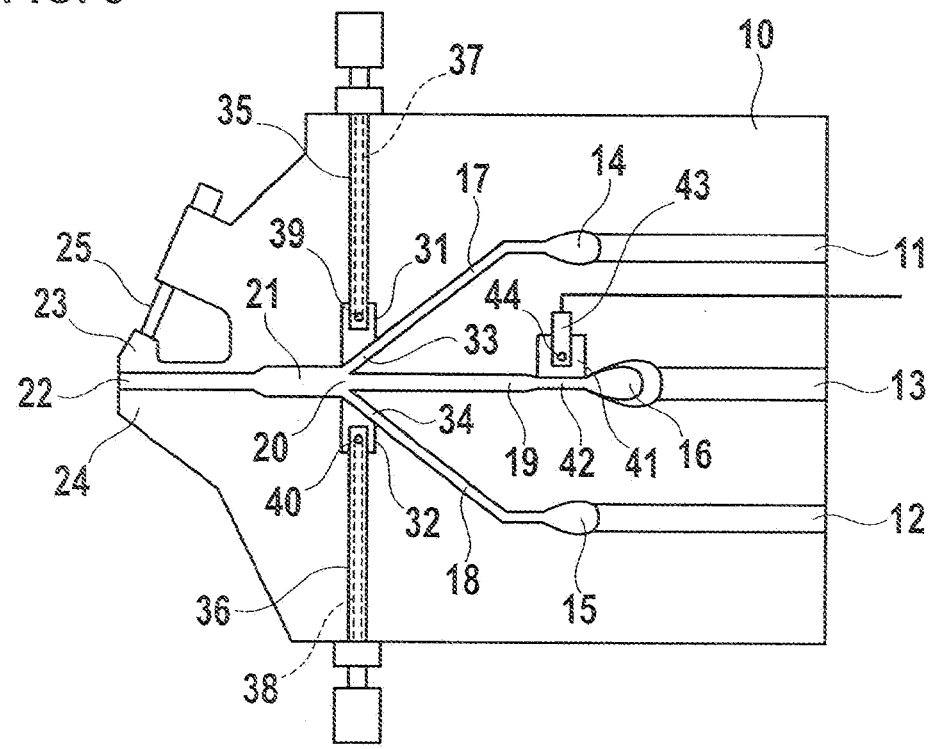
FIG. 3 is a vertical sectional view showing another embodiment in which the die for molding the multilayered film/sheet in the present invention is applied to the die for molding the three-layer film/sheet.

There will be described another embodiment in which the multilayered film/sheet molding die of the present invention is applied to a three-layer film/sheet molding die with reference to FIG. 3. It is to be noted that in FIG. 3, components corresponding to those of FIG. 2 are denoted with the same reference numerals, and description thereof is omitted.

In the present embodiment, instead of the movable choker bar 51, a fixed choker bar 41 is exchangeably mounted in the middle of an inner-layer molten resin channel 19. The fixed choker bar 41 constitutes a choker portion 42 in the middle of the inner-layer molten resin channel 19.

At a portion provided with the fixed choker bar 41, a plurality of inner-layer thermal conductors 43 are arranged at a predetermined pitch (about 20 to 60 mm) in a die width direction in the same manner as in hollow choker bolts 35, 36.

Each of the thermal conductors 43 can also be of a heat medium type pipe such as a cartridge heater or a double pipe. A distal end of the thermal conductor on the side of the fixed choker bar 41 contains a temperature sensor 44 capable of measuring temperatures precisely.

When electric currents supplied to thermal conductors 37, 38, and 43 are controlled according to the temperatures measured by temperature sensors 39, 40, and 44, the temperatures of the respective thermal conductors 37, 38, and 43 can be controlled individually and precisely. It is to be noted that the temperature sensors 39, 40, and 44 can be omitted depending on a required film/sheet thickness precision.

A flow in the whole die width direction changes in a large surge in a case where resin characteristics during actual operation are different from conditions at a time when die channels are simulated by a computer, or a case where the operation is performed using a resin of a type different from that for which the simulation was performed. This large surge is adjusted and compensated by operations of the hollow choker bolts 35, 36.

Heat of the thermal conductor 37 is conducted to a movable choker bar 31, and the surface temperature of the movable choker bar 31 is determined by the thermal conductor 37. Heat of the thermal conductor 38 is conducted to a movable choker bar 32, and the surface temperature of the movable choker bar 32 is determined by the thermal conductor 38.

A large amount of the molten resin in each of choker portions 33, 34 flows at a location where the surface temperature of each of the movable choker bars 31, 32 is high, since viscosity of the resin is lowered depending on resin characteristics. Thus the thickness of the film/sheet of the corresponding portion increases. Conversely, the flows of the molten resins are reduced in portions where the surface temperatures of the movable choker bars 31, 32 are low, and the thickness of the film/sheet of the corresponding portion decreases.

Since the choker portions 33, 34 have a small channel structure, the flow characteristics of the resin in the channel can be sufficiently controlled by the temperature. Consequently, when the pitch is excessively small for the choker portion gap adjustment by the hollow choker bolts 35, 36, the adjustment can be performed under temperature control by the thermal conductors 37, 38.

As described above, the choker portion gap adjustment by the hollow choker bolts 35, 36 is preferably manually performed, and the thermal conductor control (temperature control) by the thermal conductors 37, 38 is preferably automatically performed.

Heat of the thermal conductor 43 is conducted to the fixed choker bar 41, and the surface temperature of the fixed choker bar 41 is determined by the thermal conductor 43.

A large amount of the molten resin in the Inner-layer choker portion 42 flows at a portion where the surface temperature of the fixed choker bar 41 is high, since the viscosity of the resin is lowered depending on the resin characteristics. Consequently, a thickness of the film/sheet of the corresponding portion increases. Conversely, the flow of the molten resin is reduced at a portion where the surface temperature of the fixed choker bar 41 is low, and the thickness of the film/sheet of the corresponding portion decreases.

Since the choker portion 42 has a small channel structure, the flow characteristics of the resin in the channel can be sufficiently controlled by the temperature. Consequently, the adjustment at the small pitch can be performed under temperature control by the thermal conductor 43.

According to the present embodiment, the multilayered film/sheet molding die is also preferably used in a film/sheet molder of an automatic control system which executes a feedback control by automatic measurement of the film/sheet thickness. The respective thermal conductor 37, 38, and 44 can execute the thermal conductor control (temperature control) in accordance with an automatic measurement result of the film/sheet thickness so that the film/sheet thickness becomes constant.

It is to be noted that in a simplified machine, the set temperatures of the respective thermal conductors 37, 38, and 44 may be manually input based on the automatic measurement result of the film/sheet thickness.

When the thermal conductors 37, 38, and 43 are of a heat medium type, the surface temperatures of the movable choker bars 31, 32 and the fixed choker bar 41 can be forcibly set to be low. Therefore, a control amount by the temperature can be set within a large range.

As described above, when the choker portion gap adjustment by the hollow choker bolts 35, 36 and the thermal conductor control by the thermal conductor 37 are both used for the outer layer, it is possible to mold a multilayered film/sheet having a highly precise thickness even if operation conditions largely differ, or a resin type changes.

The thickness of the inner layer is adjusted using both the changeably fixed type of fixed choker bar 41 and the thermal conductor control by the thermal conductor 43. Since the fixed choker bar 41 is not of the gap adjustment type, a die structure is simplified, a die dimension does not increase, and the die is practically usable.

In a case where the resin characteristics largely change, simulation is performed on molding conditions of the resin, an optimum fixed choker bar is prepared on the conditions, and the fixed choker bar 41 is changed. Moreover, fine adjustment is performed under the temperature control by the thermal conductor 43.

For the outer layer, both the choker portion gap adjustment and the thermal conductor control are used. Therefore, it is possible to control the thicknesses of the resins in the outer and inner layers with a high precision by a combination of the thermal conductor control and the finer adjustment of the outer layer. In consequence, even if the operation conditions largely differ or the resin type changes, it is possible to mold the multilayered film/sheet having a highly precise thickness.

In case of the same type of resin, it is possible to mold the multilayered film/sheet having the highly precise thickness under the thermal conductor control by the outer-layer thermal conductors 37, 38 and the thermal conductor 43 and the lip gap adjustment by lip adjustment bolts 25. In consequence, it is possible to mold an optical multilayered film/sheet, with a satisfactory productivity, which requires a high thickness precision and which utilizes birefringence.

As described above, in the present embodiment, the resin thickness adjustment of each layer is possible. Furthermore, when the lip gap adjustment is performed, it is possible to mold the multilayered film/sheet in which the thickness of the resin of each layer and the whole thickness are highly precise.

Figure 4:
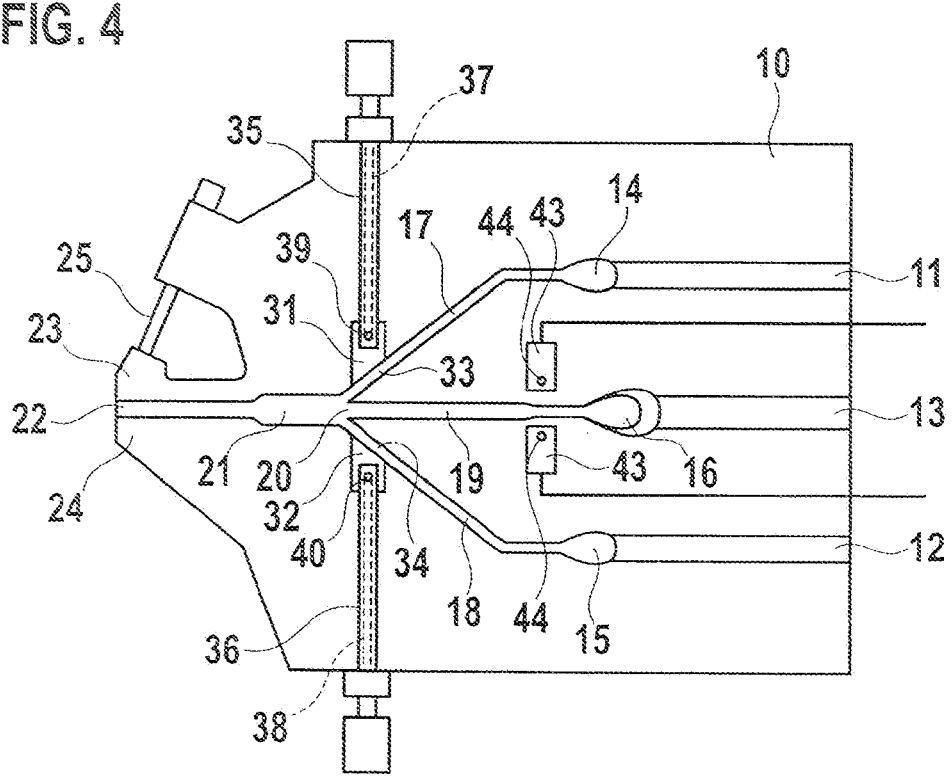
FIG. 4 is a vertical sectional view showing still another embodiment in which the die for molding the multilayered film/sheet in the present invention is applied to the die for molding the three-layer film/sheet.

There will be described a further embodiment in which the multilayered film/sheet molding die of the present invention is applied to a three-layer film/sheet molding die with reference to FIG. 4. It is to be noted that in FIG. 4, components corresponding to those of FIG. 2 are also denoted with the same reference numerals as those of FIG. 2, and description thereof is omitted.

In the present embodiment, the fixed choker bar 41 is omitted. For the inner layer, a temperature at a path in the inner wall of an inner-layer molten resin channel 19 is adjusted by thermal conductors 43 disposed on opposite sides of the inner-layer molten resin channel 19. It is to be noted that the inner-layer molten resin channel 19 is provided with a throttle at the location of the thermal conductors 43. Another constitution is the same as that of the above embodiment (FIG. 2).

Even in the present embodiment, the thickness of the outer layer is adjusted using both choker portion gap adjustment by hollow choker bolts 35, 36 and thermal conductor control by thermal conductors 37, 38. Therefore, even if operation conditions largely differ or a resin type changes, it is possible to mold a multilayered film/sheet having a highly precise thickness.

The thickness of the inner layer is adjusted under the only thermal conductor control by the thermal conductors 43. Since the thermal conductors 43 are disposed on opposite sides of the inner-layer molten resin channel 19, choker bar gap adjustment can be compensated by the thermal conductor control. Moreover, since any choker bar or any choker bar gap adjustment mechanism is not disposed for the inner layer, a die structure is simple, a die dimension does not increase, and the die is practically usable.

Even in this embodiment, the thickness of the resin of each layer can be adjusted. Furthermore, a gap between the lips is adjusted. Therefore, it is possible to mold a multilayered film/sheet in which the thickness of the resin of each layer and the whole thickness are highly precise.

It is to be noted that the thermal conductor 43 may be disposed on only one side of the inner-layer molten resin channel 19 depending on a required precision of the multilayered film/sheet.

Figure 6:
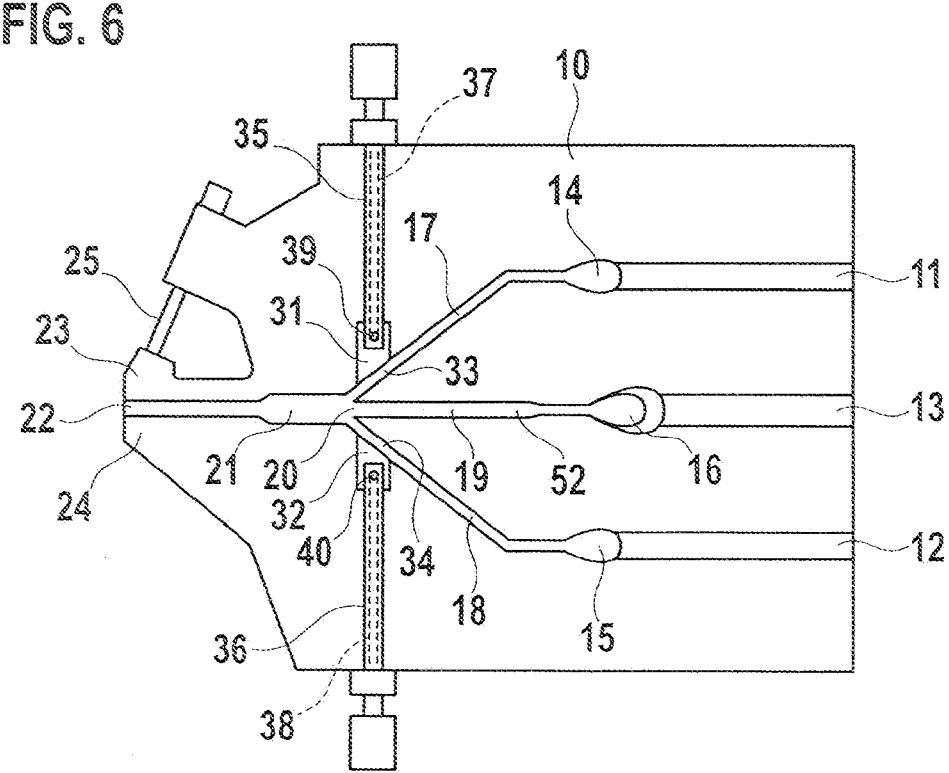
FIG. 6 is a vertical sectional view showing another embodiment in which the die for molding the multilayered film/sheet in the present invention is applied to the die for molding the three-layer film/sheet.

In the case of a three-layer film/sheet molding 2C die, the choker bars, thermal conductors, and the like may be disposed only to the outer-layer molten resin channels 17, 18, and may be omitted from the inner-layer molten resin channel 19. In other words, as shown in FIG. 6, the movable choker bars 31, 32, the hollow choker bolts 35, 36, the thermal conductors 37, 38, and the temperature sensors 39, 40 may be disposed only to the respective outer-layer molten resin channels 17, 18.

Heat from the inner-layer thermal conductors 43 or 54 is conducted not only to the inner-layer molten resin channel 19 but also to the parts of the outer-layer molten resin channels 17, 18. A rise in temperature for increasing the thickness of the inner layer is accompanied by a rise in temperature in the outer-layer parts, so that the flow rates for both inner layer and outer layers increase. Nevertheless, the lip portions limit the total thickness, so that little change takes place in the proportions of the respective layer-thicknesses. In contrast, heat from the outer-layer thermal conductors 37, 38 is conducted only to the outer-layer parts, so that an effective adjustment of the proportions of the respective layer-thicknesses is made possible. Accordingly, while the thermal conductors 37, 38 are attached only to the outer layers, the total thickness can be adjusted with the lip gap.

As described above, the following advantage is obtained. Even with no thermal conductors provided to the inner layer, irregularity adjustment can be carried out at a shorter pitch than in the case of a conventional type die in which choke bars are pushed and pulled.

In the above embodiments, the die for molding the three-layer film/sheet has been described, but the multilayered film/sheet molding die of the present invention may be similarly constituted for a die for molding a film/sheet having four, five or more layers including a plurality of inner layers.

Figure 7:
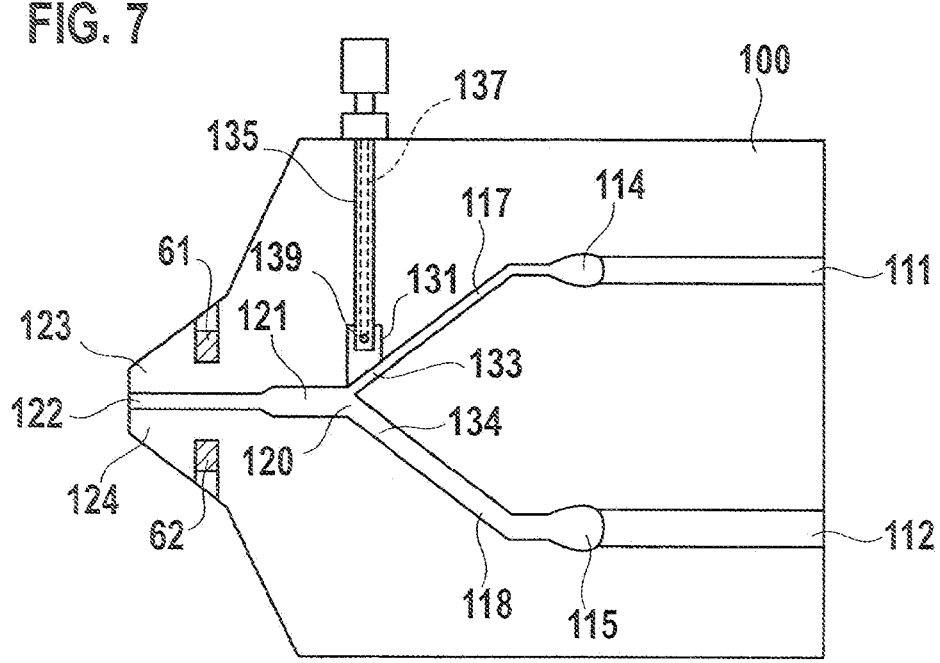
FIG. 7 is a vertical sectional view showing another embodiment in which the die for molding the multilayered film/sheet in the present invention is applied to the die for molding the two-layer film/sheet.
Figure 8:
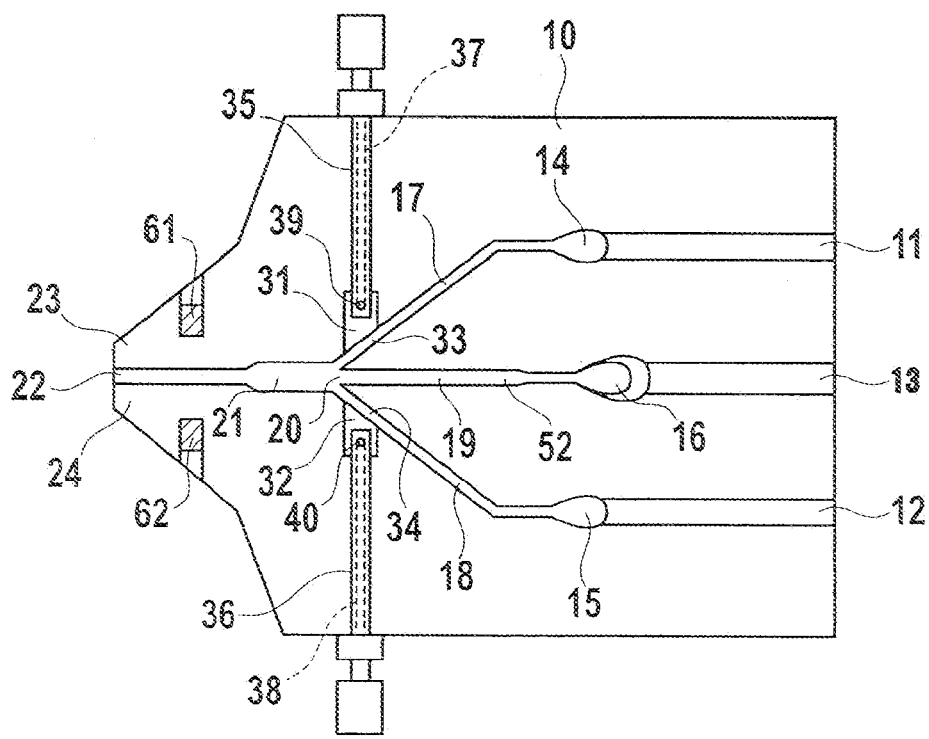
FIG. 8 is a vertical sectional view showing another embodiment in which the die for molding the multilayered film/sheet in the present invention is applied to the die for molding the three-layer film/sheet.

Incidentally, in addition to the lip gap adjustment mechanism using lip adjustment bolts 25 and 125, there may be another way of adjusting the thickness at an arbitrarily determined position in the width direction of the film/sheet at the die outlets 22, 122. As shown in FIG. 7 and FIG. 8, a plurality of cartridge heaters (heater elements) 61, 62 installed as being embedded, at a predetermined pitch in the width direction of the die, in each of the upper lip portions 23, 123 and in each of the lower lip portions 24, 124. Then the temperatures of these cartridge heaters 61, 62 are individually adjusted. Thus, the temperature-viscosity-flow rate characteristics of molten resin at the die outlets 22, 122 are taken advantage of.

INDUSTRIAL APPLICABILITY

The multilayered film/sheet molding die according to the present invention, when the choker portion gap adjustment by the choker adjustment bolts and the thermal conductor control by the thermal conductors are both used, it is possible to mold a film/sheet having a highly precise thickness even if operation conditions differ significantly, or a resin type changes.

With the thermal conductors, the surface temperature of each choker bar in the molten resin channel of each layer can be controlled at a pitch equivalent to the pitch at which the choker adjustment bolts are arranged. A high surface temperature of the choker bar lowers the viscosity of the molten resin of the choker portion because of the characteristics of the resin, and results in a larger amount of resin flow. This results in an increase in the thickness of a part of the film sheet corresponding to the portion at where the surface temperature of the choker bar is high. In contrast, a low surface temperature reduces the resin flow. This results in a decrease in the thickness of film/sheet of a portion corresponding to the portion where the surface temperature of the choker cover is low. A fine adjustment at a short pitch is made possible by the control performed by the thermal conductors. As a result, it is possible to mold a film/sheet having a highly precise thickness.

What is claimed is:

1. A multilayered film/sheet molding die of a multi manifold system, including a plurality of manifold portions, and a plurality of molten resin channels, the multilayered film/sheet molding die comprising:
    a choker portion gap adjustment mechanism in which, a movable choker bar is movably arranged in the middle of at least one of the plurality of molten resin channels, and in which the choker bar is moved by turning a plurality of choker adjustment bolts arranged at a predetermined pitch in the die width direction and thus the gap in the choker portion is adjusted,
    wherein each of the choker adjustment bolts is provided with a thermal conductor, a distal end of the thermal conductor reaches the movable choker bar, and heat of the thermal conductor is conducted to the movable choker bar: and
    the distal end of each thermal conductor is provided with a temperature sensor that determines the surface temperature of the movable choker bar.

2. The multilayered film/sheet molding die according to claim 1, which is used for molding a multilayered film/sheet with layers of different thicknesses from each other, the multilayered film/sheet molding die, wherein the movable choker bar is movably arranged in the middle of only the molten resin channel for the thinner layer.

3. A multilayered film/sheet molding die of a multi manifold system, which includes two manifold portions and two molten resin channels for two outer layers, and at least one manifold portion and at least one molten resin channel for at least one inner layer, the multilayered film/sheet molding die comprising:
    a choker portion gap adjustment mechanism for the outer layers in which mechanism, a movable choker bar is movably arranged in the middle of each molten resin channel for the outer layer, and, in which mechanism, the choker bar is moved by turning a plurality of choker adjustment bolts arranged at a predetermined pitch in the die width direction and thus the gap in the choker portion is adjusted;
    wherein each of the choker adjustment bolts is provided with a thermal conductor, a distal end of the thermal conductor reaches the movable choker bar, and heat of the thermal conductor is conducted to the movable choker bar; and the distal end of each thermal conductor is provided with a temperature sensor that determines the surface temperature of the movable choker bar.

4. A multilayered film/sheet molding die of a multi manifold system, which includes two manifold portions and two molten resin channels for two outer layers, and at least one manifold portion and at least one molten resin channel for an inner layer, the multilayered film/sheet molding die comprising:
   a choker portion gap adjustment mechanism for the outer layers in which mechanism, a movable choker bar is movably arranged in the middle of each molten resin channel for the outer layer, and, in which mechanism, the choker bar is moved by turning a plurality of choker adjustment bolts arranged at a predetermined pitch in the die width direction and thus the gap in the choker portion is adjusted; and
   a fixed choker bar that is fixedly arranged in the middle of each molten resin channel for each inner layer,
   wherein each of the choker adjustment bolts is provided with a thermal conductor, a distal end of the thermal conductor reaches the movable choker bar, heat of the thermal conductor is conducted to the movable choker bar,
   thermal conductors are arranged at a predetermined pitch in the die width direction in the portion where the fixed choker bar is arranged, and
   the distal end of each thermal conductor of the choker adjustment bolts is provided with a temperature sensor that determines the surface temperature of the movable choker bar.

5. A multilayered film/sheet molding die of a multi manifold system, which includes two manifold portions and two molten resin channels for two outer layers, and at least one manifold portion and at least one molten resin channel for an inner layer, the multilayered film/sheet molding die comprising:
   a choker portion gap adjustment mechanism for the outer layers in which mechanism, a movable choker bar is movably arranged in the middle of each molten resin channel for the outer layer, and, in which mechanism, the choker bar is moved by turning a plurality of choker adjustment bolts arranged at a predetermined pitch in the die width direction and thus the gap in the choker portion is adjusted,
   wherein each of the choker adjustment bolts is provided with a thermal conductor, a distal end of the thermal conductor reaches the movable choker bar, heat of the thermal conductor is conducted to the movable choker bar and the distal end of each thermal conductor is provided with a temperature sensor that determines the surface temperature of the movable choker bar, and
   thermal conductors are arranged at a predetermined pitch in the die width direction in the middle of each molten resin channel for each inner layer.

6. The multilayered film/sheet molding die according to claim 1, further comprising:
   an upper and a lower lip portions;
   a die outlet with a slit shape which is long in the die width direction, the die outlet being defined by the upper and the lower lip portions; and
   a lip gap adjustment mechanism for adjusting the gap between the lips in the die outlet.

7. The multilayered film/sheet molding die according to claim 1, further comprising:
   an upper and a lower lip portions;
   a die outlet with a slit shape which is long in the die width direction, the die outlet being defined by the upper and the lower lip portions; and
   a plurality of heater elements, the respective temperatures of which are individually adjustable, installed at a predetermined pitch in the die width direction of at least one of the upper and the lower lip portions.

8. The multilayered film/sheet molding die according to claim 5, wherein each of the thermal conductors is provided with a temperature sensor.

9. The multilayered film/sheet molding die according to claim 3, further comprising:
   an upper and a lower lip portions;
   a die outlet with a slit shape which is long in the die width direction, the die outlet being defined by the upper and the lower lip portions; and
   a lip gap adjustment mechanism for adjusting the gap between the lips in the die outlet.

10. The multilayered film/sheet molding die according to claim 4, further comprising:
    an upper and a lower lip portions;
    a die outlet with a slit shape which is long in the die width direction, the die outlet being defined by the upper and the lower lip portions; and
    a lip gap adjustment mechanism for adjusting the gap between the lips in the die outlet.

11. The multilayered film/sheet molding die according to claim 5, further comprising:
    an upper and a lower lip portions;
    a die outlet with a slit shape which is long in the die width direction, the die outlet being defined by the upper and the lower lip portions; and
    a lip gap adjustment mechanism for adjusting the gap between the lips in the die outlet.

12. The multilayered film/sheet molding die according to claim 3, further comprising:
    an upper and a lower lip portions;
    a die outlet with a slit shape which is long in the die width direction, the die outlet being defined by the upper and the lower lip portions; and
    a plurality of heater elements, the respective temperatures of which are individually adjustable, installed at a predetermined pitch in the die width direction of at least one of the upper and the lower lip portions.

13. The multilayered film/sheet molding die according to claim 4, further comprising:
    an upper and a lower lip portions;
    a die outlet with a slit shape which is long in the die width direction, the die outlet being defined by the upper and the lower lip portions; and
    a plurality of heater elements, the respective temperatures of which are individually adjustable, installed at a predetermined pitch in the die width direction of at least one of the upper and the lower lip portions.

14. The multilayered film/sheet molding die according to claim 5, further comprising:
    an upper and a lower lip portions;
    a die outlet with a slit shape which is long in the die width direction, the die outlet being defined by the upper and the lower lip portions; and
    a plurality of heater elements, the respective temperatures of which are individually adjustable, installed at a predetermined pitch in the die width direction of at least one of the upper and the lower lip portions.

* * * * *